UNITED STATES PATENT OFFICE.

HENRY GERNER, OF NEW YORK, N. Y., ASSIGNOR TO HEVEENOID MANUFACTURING COMPANY, OF SAME PLACE.

MANUFACTURE OF VULCANIZED INDIA-RUBBER PRODUCTS.

SPECIFICATION forming part of Letters Patent No. 229,817, dated July 13, 1880.

Application filed May 28, 1880. (Specimens.)

*To all whom it may concern:*

Be it known that I, HENRY GERNER, of the city of New York, in the county of New York, and in the State of New York, have invented certain new and useful Improvements in the Manufacture of Vulcanized India-Rubber Products, including Heveenoid; and I do hereby declare that the following is a full, clear, and exact description of my invention, enabling persons experienced in rubber manufacture to make and use the same, supposing them to be already familiar with the treatment and use of camphor in india-rubber processes, embodied in improvements for which Letters Patent have been granted me in the United States and various foreign countries, the product or material therein patented being now commonly known as "heveenoid."

The present invention relates to an improved process having for its design the cheapening, enlarging the field of utility, and enhancing the merits of vulcanized india-rubber products, including heveenoid.

I have found that the flours of a large number of agricultural germs, fruits, grains, and seeds when properly incorporated with india-rubber, camphor, and sulphur, in the same manner as other substances are now commonly incorporated with these substances in india-rubber processes, and the compound is exposed to a proper temperature during a given length of time, varying with the desired nature of the product, will make a most excellent, cheap, and desirable product, either hard, semi-hard, or soft.

Experiments have taught me that the flours of such agricultural germs, fruits, grains, and seeds as contain sulphur—such as wheat, rye, barley, oats, corn, rape, flax, mustard, and the fruits and seeds of many edible vegetables, and such analogous germs, fruits, grains, and seeds, when properly freed from chaff, husks, and impurities, and reduced to an impalpable powder or flour—will most readily combine with india-rubber, camphor, and sulphur when properly incorporated and vulcanized, and will produce most excellent materials, either hard, semi-hard, or soft; but I have learned, too, that flours of such agricultural germs, fruits, grains, and seeds as do not contain any sulphur—such as rice, hemp, poppy, lentils, clover, sorghum, vetches, buckwheat, chestnuts, acorns, and other nuts and analogous germs, fruits, grains, and seeds, treated as the former class—will also incorporate with india-rubber, camphor, and sulphur, although not to the perfection or to the extent as the sulphur-bearing class.

I have also found that, although the combination of the flours of all of the hereinbefore-mentioned germs, fruits, grains, and seeds is most perfect and productive of more desirable results, as regards cheapness and merit, when camphor is used in combination with india-rubber and sulphur, forming a species of heveenoid, still india-rubber and sulphur alone will also combine with the said flours.

When one or several of all of the said flours are used together with india-rubber, camphor, and sulphur in proportions productive of a hard material, being combined together, just as any other ingredients would be in the common heveenoid process, the mixture or compound is vulcanized by heat ranging as high as 312° to 320° Fahrenheit, to insure proper vulcanization, during a period of from four to six hours. This heat should be arrived at gradually during, say, half of the time, and maintained at the maximum point during the other half to get the best results.

When one or several of all the said flours are used together with india-rubber, camphor, and sulphur in proportions productive of a soft material, the compound, after the proper incorporation of its ingredients, is subjected to a heat, for the purpose of proper vulcanization, up to 300° or 320° Fahrenheit, according to the quality required.

The time varies so greatly with the different goods and qualities that it is impossible to make a definite statement with regard to the same. It varies from a half-hour up to as much as several hours.

When one or several of all of the said flours are used together with india-rubber and sulphur alone—*i. e.*, without any camphor in the mixture—the treatment and vulcanization are the same as well known and used for hard and soft vulcanized india-rubber.

I desire to have understood that wherever, in this specification and in the following claim, I make use of the term "india-rubber" I mean to include at the same time all gums which are analogous to the same; also, of the term "sulphur" I mean both sulphur alone and sulphur in any of its chemical combinations; and of the term "camphor" I mean camphor, both natural and artificial, and such gums and resins as are analogous to it.

I am aware that india-rubber and other gums have been mixed with flour made from agricultural seeds, and I do not claim such broadly; but What I do claim is—

The mixture, resembling india-rubber, herein described, consisting of appropriate parts of india-rubber or other gum, camphor, and flour made from the seed of agricultural germs, as set forth.

In witness whereof I have hereunto set my hand on this 18th day of May, 1880.

HENRY GERNER.

Witnesses:
RICHARD GERNER,
M. DITTENHOEFER.